Sept. 24, 1957   J. D. FLEMING   2,807,511
COATED PISTON RING
Filed May 11, 1953
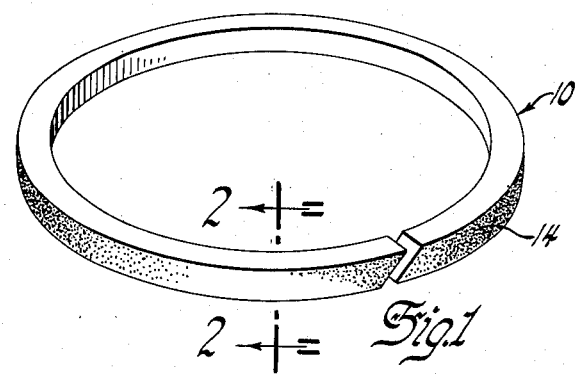
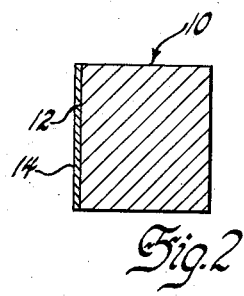
INVENTOR
James D. Fleming
BY
ATTORNEY

United States Patent Office 2,807,511
Patented Sept. 24, 1957

2,807,511

COATED PISTON RING

James D. Fleming, Detroit, Mich., assignor to General Motors Corporation, Detroit, Mich., a corporation of Delaware Application May 11, 1953, Serial No. 354,031

4 Claims. (Cl. 309—23)

This invention relates to piston rings for reciprocating machines and particularly to piston rings which are coated with polytetrafluoroethylene to reduce the sliding friction between the piston skirts and cylinder wall surfaces.

In reciprocating machines, such as modern high speed internal combustion engines, it is desirable to reduce rubbing or sliding friction between the piston rings and the side walls of the cylinders to the greatest possible extent. Such a reduction in friction results not only in decreasing the amount of wear between the parts but also increases the efficiency of the engine or other machine.

Accordingly, a principal object of this invention is to provide a piston ring for a reciprocating machine which is coated in such a manner as to substantially reduce the friction between the piston ring and the cylinder walls against which it slides. A further object of the invention is to provide one especially for internal combustion engines, such a coated piston ring which retains its coating under operating conditions for a greatly extended period of time.

These and other objects are attained in accordance with the present invention with a piston ring which has its outer side surfaces provided with a thin, hard and tough coating of polytetrafluoroethylene. A coated piston ring of this type is inexpensively formed since the coating may be easily and quickly applied to the piston ring surfaces by either spraying or dipping, the coating functioning equally well on cast iron, aluminum or other metallic pistons. As hereinbefore indicated, the use of such a coated piston ring measurably reduces the sliding friction between the cylinder walls and piston ring, thus increasing the efficiency of the engine or other machine in which it is used. Furthermore, the polytetrafluoroethylene coating is thermally stable and chemically inert, and hence it does not adversely affect lubricating oils or the metallic surfaces of piston rings, pistons or cylinders.

Other objects and advantages of this invention will more fully appear from the following detailed description of a preferred embodiment of the invention, reference being made to the accompanying drawing, in which:

Figure 1 is a perspective view showing a piston ring coated with a layer of polytetrafluoroethylene, and Figure 2 is a sectional view along the line 2—2 of Figure 1.

Referring more particularly to the drawing, in Figure 1 is shown a metallic split piston ring, indicated generally by 10, for use on a metal piston of an internal combustion engine. In accordance with my invention, the outer cylinder-contacting surface 12 of this piston ring is provided with a hard, thin coating 14 of polytetrafluoroethylene which substantially reduces friction between the piston ring and adjacent cylinder walls. This anti-friction layer 14 is best shown in Figure 2. It will be appreciated that the thickness of the polytetrafluoroethylene coating is greatly exaggerated in the drawing for purposes of clarity, and that such a coating should not be more than approximately 0.007 inch thick. Likewise, while the coating is shown as applied to only the outer, cylindrical, side surfaces of the piston ring, it should also be understood that it may be more convenient in some instances to coat all the surfaces of the ring. The determination of whether or not the top, bottom and inner side surfaces of the piston ring are to be coated would be dependent to a great extent on the method of applying the polytetrafluoroethylene. If a dipping method is used, as will be hereinafter more fully explained, all the surfaces will become coated, while spraying the coating on the piston ring will not necessarily result in coating surfaces other than those which contact the cylinder walls. As indicated above, the chemical inertness of polytetrafluoroethylene prevents it from detrimentally affecting adjacent parts even if the entire ring is coated.

If any rust, grease, organic coatings or dirt is initially present on the piston ring surfaces to be coated, such foreign matter should be carefully removed by first sanding, followed by washing with a volatile solvent. Sand blasting should be done carefully to avoid excessive pitting of the ring, which preferably is formed of a ferrous metal. If the polytetrafluoroethylene is not used while still fresh, it is desirable to thoroughly agitate and filter it with a cloth filter before use to remove any small particles of coagulum which may be formed during storage.

I have found it most advantageous to apply polytetrafluoroethylene to the piston ring surfaces in the form of a low-viscosity dispersion in a water medium. The coating is preferably applied at room temperature, rather than being first heated, thereby preventing the water from evaporating too rapidly. Too rapid evaporation would result in unequal distribution of the polytetrafluoroethylene and hence an unequal coating thickness on the piston ring.

In order to provide optimum results with a polytetrafluoroethylene coated piston ring, the surfaces of the ring should be prepared and cleaned, as indicated above, and the polytetrafluoroethylene applied as a very thin layer. This is most conveniently and satisfactorily done by spraying. The coating on the piston ring surfaces should then be dried, preferably at a temperature below approximately 200° F., until the water is evaporated. Either air drying at room temperature or oven drying is satisfactory. Following the drying operation, the polytetrafluoroethylene-coated piston ring should be baked at a temperature of at least approximately 750° F. until sintering of the polytetrafluoroethylene occurs. I have found that an exceptionally hard coating may be obtained if the coated piston ring, after sintering and while still hot, is immediately immersed in water.

If desired, several coats of polytetrafluoroethylene may be applied to the surfaces of the piston ring, it being preferable to repeat the above-described drying and baking steps between the application of the polytetrafluoroethylene layers. Moreover, in most instances, in order to obtain proper adhesion of subsequent parting layers to the piston ring surfaces it is usually desirable to initially apply a polytetrafluoroethylene priming layer. When such a priming coating is used, it likewise should be dried at a temperature below approximately 200° F. and baked at a temperature in excess of 750° until sintered. Then the final layer or layers of polytetrafluoroethylene may be applied in the above-described manner. In general, in order to obtain optimum toughness and durability, it is preferable to use several layers of polytetrafluoroethylene to obtain the proper coating thickness, rather than to apply one thicker coat. Too thick a single layer results in the rough, irregular condition known as "orange peel."

An example of a polytetrafluoroethylene primer which may be used is Dupont Teflon Primer 850-201, while Dupont Clear Finish 852-201 may be used as the finish coating. In most instances, it is desirable to use two coats of the latter material over the priming layer.

While satisfactory results may be obtained if the average thickness of the tetrafluoroethylene polymer coat, or the average total thickness of the plurality of coats if more than one polytetrafluoroethylene application is used, ranges from about 0.001 inch to 0.005 inch, it is preferred in most instances to have a coating thickness between approximately 0.0015 inch and 0.0025 inch. If a primer layer is used, the thickness of this priming layer will be about 0.0002 inch to 0.0005 inch.

Although the surface layer of polytetrafluoroethylene frequently may be applied by brush coating or dip coating, in general it is most advantageous if the polytetrafluoroethylene is applied by spraying. A fine mist momentarily directed onto the piston ring surfaces provides an evenly distributed coating which materially reduces sliding friction, since water dispersions of polytetrafluoroethylene are low-viscosity liquids capable of being easily sprayed. Upon contact with the piston ring the water rapidly evaporates, leaving a very thin, evenly distributed layer or film of polytetrafluoroethylene on the piston ring. This layer is then fused, as hereinbefore explained. When spray coating, five to ten pounds pressure on the fluid feed and 35 to 50 pounds on the air will generally be satisfactory. The air outlet should be maintained a sufficient distance from the film to prevent blowing the wet film into ripples.

The priming coat normally dries relatively slowly, however, and after a few moments at room temperature, may be subjected to gentle heating at a temperature not in excess of approximately 200° F. in an oven or by other suitable means. The source of heat should be sufficiently distant from the polytetrafluoroethylene film to prevent blistering the wet film. Although satisfactory results are generally provided if the surface temperature of the piston ring is maintained below the boiling point of water while applying successive layers of the coating, it is usually preferable, in order to avoid dry overspray and consequently a rough film, to reduce the ring temperature to approximately 120° F.

Under certain conditions, a very uniform layer of polytetrafluoroethylene may be obtained by dip coating. In coating in this manner, it is necessary to remove all bubbles from the surface of the polytetrafluoroethylene and to prevent any bubbles from being trapped on the coated piston ring surfaces. As compared with spray coating of polytetrafluoroethylene, when this material is used as a dip coat it is desirable to reduce its viscosity by adding distilled water, a reduction of approximately 20% providing good results. Normally brush coating of polytetrafluoroethylene is not advisable inasmuch as polytetrafluoroethylene is subject to coagulation due to mechanical working.

After the final bake or after each sintering step and while still hot, it is desirable in most instances to immediately quench the polytetrafluoroethylene-coated piston ring in water since a quenched film is tougher, harder, and more durable than one which has been cooled slowly. Likewise, if it is desired to reduce the temperature rapidly to facilitate application of the succeeding coat, quenching with cold water may be done immediately after the fusing of each coat.

Tests on piston rings coated in the above-described manner with polytetrafluoroethylene indicate that such coated piston rings can be used over greatly extended periods of time under normal operating conditions without detrimental effects on the heat-stable coating. The antifriction properties of tetrafluoroethylene-coated piston rings were also tested in a friction test engine and compared with uncoated pistons. The results of such tests showed that use of a set of piston rings which were coated with tetrafluoroethylene resulted in an average of approximately 8% less engine friction than a set of conventional, uncoated, chromium-plated piston rings used in the same engine under similar conditions.

It is to be understood that, while my invention has been described by means of certain specific examples, the scope of my invention is not to be limited thereby except as defined in the following claims.

I claim:

1. In an internal combustion engine, a piston ring for operation in a main cylinder thereof, said piston ring comprising a resilient ferrous base metal member shaped in the form of an annular split piston ring having a smooth, non-porous, outer side surface provided with a continuous, non-porous coating of sintered polytetrafluoroethylene, said coating having a thickness between approximately 0.001 inch and 0.005 inch.

2. In an internal combustion engine, a piston ring for use in a main cylinder thereof, said piston ring comprising a resilient ferrous metal member shaped in the form of a split piston ring having a smooth, non-porous, generally cylindrical outer surface, said piston ring being provided with a hard, durable, continuous coating of sintered polytetrafluoroethylene securely adhering to said surface, said coating having an average thickness of approximately 0.0015 inch to 0.0025 inch.

3. A metal piston ring for use in a main cylinder of an internal combustion engine, said piston ring comprising a resilient ferrous base metal member shaped in the form of an annular piston ring having a smooth, non-porous cylinder-contacting outer surface, said surface having bonded thereto a plurality of continuous thin layers of sintered polytetrafluoroethylene, the total thickness of said layers being between about 0.001 inch and 0.005 inch.

4. In an internal combustion engine, a piston ring for operation in a main cylinder thereof, said piston ring being characterized by low frictional properties and comprising a resilient ferrous metal member shaped in the form of an annular split piston ring having a smooth, non-porous generally cylindrical outer surface, said surface having securely bonded thereto a hard, continuous coating consisting of a priming layer of sintered polytetrafluoroethylene directly adhering to said outer surface, said priming layer having a thickness between about 0.0002 inch and 0.0005 inch, and a plurality of finishing layers of sintered polytetrafluoroethylene on the surface of said priming layer, the total thickness of said layers being approximately 0.001 inch to 0.005 inch.

References Cited in the file of this patent

UNITED STATES PATENTS

| | | |
|---|---|---|
| 2,158,461 | Koehring | May 16, 1939 |
| 2,313,395 | Phillips | Mar. 9, 1943 |
| 2,315,798 | Koether | Apr. 6, 1943 |
| 2,320,921 | Ford | June 1, 1943 |
| 2,510,078 | Compton | June 6, 1950 |
| 2,562,118 | Osdal | July 24, 1951 |
| 2,597,976 | Cousins | May 27, 1952 |
| 2,686,767 | Green | Aug. 17, 1954 |
| 2,691,814 | Tait | Oct. 19, 1954 |
| 2,710,266 | Hochberg | June 7, 1955 |

FOREIGN PATENTS

| | | |
|---|---|---|
| 474,252 | Great Britain | Oct. 28, 1937 |
| 657,080 | Great Britain | Sept. 12, 1951 |
| 442,219 | Canada | June 17, 1947 |
| 510,979 | Canada | Mar. 15, 1955 |